United States Patent

Katagiri et al.

[11] 4,359,515
[45] Nov. 16, 1982

[54] DISAZO ELECTROPHOTOGRAPHIC LIGHT-SENSITIVE MEDIA

[75] Inventors: Kazuharu Katagiri; Katsunori Watanabe; Shigeto Ohta; Shozo Ishikawa; Makoto Kitahara, all of Tokyo, Japan

[73] Assignees: Copyer Co., Ltd.; Canon Inc., both of Tokyo, Japan

[21] Appl. No.: 238,281

[22] Filed: Feb. 25, 1981

[30] Foreign Application Priority Data

Feb. 25, 1980 [JP] Japan .................... 55-21670

[51] Int. Cl.³ .................... G03G 5/06; C09B 31/02; C09B 31/14; C09B 33/02
[52] U.S. Cl. ........................ 430/70; 430/71; 430/72; 430/75; 430/76; 430/77; 430/78; 430/79; 260/152; 260/155; 260/157; 260/164; 260/169; 260/174; 260/178
[58] Field of Search .............. 430/70, 71, 72, 75, 430/76, 77, 78, 79; 260/152, 155, 157, 164, 169, 174, 178

[56] References Cited

U.S. PATENT DOCUMENTS

| 3,658,675 | 4/1972 | Jones et al. | 430/72 X |
|---|---|---|---|
| 3,884,691 | 5/1975 | Rochlitz | 430/76 X |
| 3,977,870 | 8/1976 | Rochlitz | 430/76 X |
| 4,072,520 | 2/1978 | Rochlitz et al. | 430/71 X |
| 4,247,614 | 1/1981 | Ohta et al. | 430/72 X |
| 4,251,613 | 2/1981 | Sasaki et al. | 430/72 |
| 4,299,896 | 11/1981 | Hashimoto et al. | 430/72 X |

*Primary Examiner*—Roland E. Martin, Jr.
*Attorney, Agent, or Firm*—Sughrue, Mion, Zinn, Macpeak & Seas

[57] ABSTRACT

An electrophotographic light-sensitive medium comprising a light-sensitive layer containing a dis-azo compound represented by Formula (1)

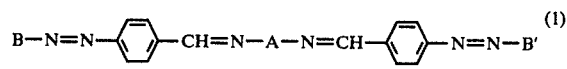

wherein A represents a single chemical bond, a divalent hydrocarbon group containing a conjugated double bond, a divalent hydrocarbon group containing a nitrogen atom in a conjugated double bond, or a divalent heterocyclic group which may be condensed with a benzene ring or substituted and forms a conjugated double bond system in combination with the adjacent azomethine groups, and B and B', which may be the same or different, each represents a coupler having aromatic properties.

16 Claims, No Drawings

DISAZO ELECTROPHOTOGRAPHIC LIGHT-SENSITIVE MEDIA

BACKGROUND OF THE INVENTION

This invention relates to an electrophotographic light-sensitive medium prepared using a novel dis-azo compound containing therein at least two azomethine groups.

Various types of light-sensitive media bearing an electrically conductive layer and an organic pigment-containing layer provided on the electrically conductive layer have heretofore been known, including:

(1) a light-sensitive medium as disclosed in Japanese Patent Publication No. 1667/1977 in which a layer prepared by dispersing a pigment in an insulative binder is provided on an electrically conductive layer;

(2) a light-sensitive medium as disclosed in Japanese Patent Application (OPI) Nos. 30328/1972 (corresponding to U.S. Pat. No. 3,894,868) and 18545/1972 (corresponding to U.S. Pat. No. 3,870,516) in which a layer prepared by dispersing a pigment in a charge transport substance or a charge transport medium comprising the charge transport substance and an insulative binder (which may also be a charge transport substance) is provided on an electrically conductive layer;

(3) a light-sensitive medium as disclosed in Japanese Patent Application (OPI) No. 105537/1974 (corresponding to U.S. Pat. No. 3,837,851) which comprises an electrically conductive layer, a charge generation layer containing a pigment, and a charge transport layer; and (4) a light-sensitive medium as disclosed in Japanese Patent Application (OPI) No. 91648/1974 in which an organic pigment is added to a charge transfer complex.

As pigments for use in these light-sensitive media, a number of pigments, such as phthalocyanine based pigment, polycyclic quinone based pigment, azo based pigment and quinacridone based pigment, have been proposed, but few of them have been put in practice.

The reason for this is that these organic photoconductive pigments are inferior in sensitivity, durability, etc., to inorganic pigments such as Se, CdS, ZnO, etc.

However, light-sensitive media prepared using inorganic photoconductive pigments also suffer from disadvantages.

For example, with a light-sensitive medium prepared using Se, crystallization of Se is accelerated by heat, moisture, dust, finger print, etc., and in particular, when the atmospheric temperature of the light-sensitive medium exceeds about 40° C., the crystallization becomes significant, resulting in a reduction in charging properties and formation of white spots in an image. Although Se-based light-sensitive medium can theoretically produce about 30,000 to 50,000 copies, it often fails to produce so many copies because it is adversely influenced by the environmental conditions of the location where the copying machine in which it is used is placed.

In the case of a CdS-based light-sensitive medium covered with an insulative layer, its durability is nearly equal to that of the Se-based light-sensitive medium. Additionally, use of CdS results in deterioration of the moisture resistance of the CdS-based light-sensitive medium and it is very difficult to improve this poor moisture resistance. At the present time, therefore, it is necessary to provide an auxiliary means, e.g., a heater.

With a ZnO-based light-sensitive medium, the sensitization thereof is caused by the use of dyes exemplified by Rose Bengale and, therefore, problems such as deterioration due to corona charging and discoloration of the dye by light arise. At the present time, it is generally believed that only about 1,000 copies can be produced by the Se-based light-sensitive medium.

Furthermore, the Se-based light-sensitive medium is expensive and causes pollution problems, as is also the case with the CdS-based light-sensitive medium.

The sensitivity of conventional light-sensitive media, when expressed as an exposure amount for half decay (E ½), is as follows: a Se-based light-sensitive medium which is not sensitized, about 15 lux.sec; a Se-based light-sensitive medium wich is sensitized, about 4 to 8 lux.sec; a CdS-based light-sensitive medium, about equal to that of the sensitized Se-based light-sensitive medium; and a ZnO-based light-sensitive medium, about 7 to 12 lux.sec.

When the light-sensitive medium is used in a PPC (plane paper copior) copying machine (manufactured by Copyer Co., Ltd.), its sensitivity is desirably less than 20 lux.sec as E ½, whereas when used in a PPC copying machine whose rate of duplication is higher, its sensitivity is more preferably 15 lux.sec or less as E ½. Of course, those light-sensitive media having lower sensitivities than above described can also be used, depending on the purpose for which they are used, i.e., cases where the light-sensitive medium is not necessary to be repeatedly used, such as, for example, cases where the light-sensitive medium is used as a coating paper and a toner image is directly formed on the coating paper in copying of a drawing, etc.

SUMMARY OF THE INVENTION

As a result of extensive investigation to overcome the above described defects of the conventional inorganic light-sensitive media and to overcome the above described defects of the organic electrophotographic light-sensitive media heretofore proposed, it has now been found that dis-azo compounds containing therein at least two azomethine groups can easily be prepared from diamines and aldehydo group-containing monoazo compounds which are available on the market, such as p-phenylenediamine, 1,5-naphthalenediamine, benzidine based diamines, p,p'-cyanostilbene, etc., and that light-sensitive media prepared using such dis-azo compounds have high sensitivity and durability to such an extent that they can satisfactorily be put into practical use, and overcome disadvantages of the inorganic light-sensitive media, e.g., poor heat resistance (e.g., crystallization of Se), poor moisture resistance, discoloration by light, pollution, etc.

This invention, therefore, provides an electrophotographic light-sensitive medium comprising a light-sensitive layer containing therein a dis-azo compound represented by Formula (1)

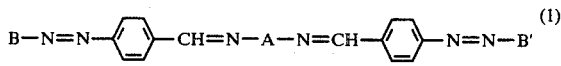
(1)

wherein A represents a single chemical bond, a divalent hydrocarbon group containing therein a conjugated double bond, a divalent hydrocarbon group containing a nitrogen atom in a conjugated double bond, or a heterocyclic group which may be condensed with a benzene ring or substituted, and forms a conjugated double bond system in combination with the adjacent azomethine groups, and B and B', which may be the same or different, each represents a coupler having aromatic properties.

DETAILED DESCRIPTION OF THE INVENTION

The dis-azo compound as used in this invention is represented by Formula (1)

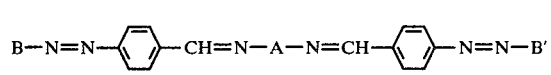

wherein A represents a single chemical bond, a divalent hydrocarbon group containing therein a conjugated double bond, a hydrocarbon group containing a nitrogen atom in a conjugated double bond, or a heterocyclic group which may be condensed with a benzene ring or substituted, and is capable of forming a conjugated double bond system in combination with the adjacent azomethine groups, and B and B' may be the same or different and each represents a coupler having aromatic properties.

The term "a coupler having aromatic properties" referred to herein means an aromatic coupler containing therein a phenolic hydroxy group, such as, for example, a hydroxynaphthoic acid amide type coupler, a hydroxynaphthalic acid imide type coupler and an aminonaphthol type coupler.

Preferred examples of A include a single chemical bond and divalent groups represented by the Formulae

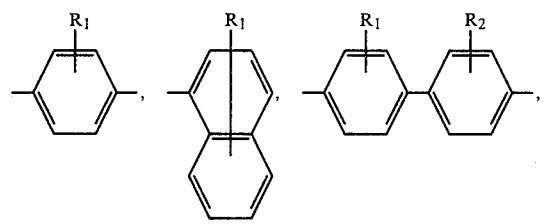

(2)   (3)   (4)

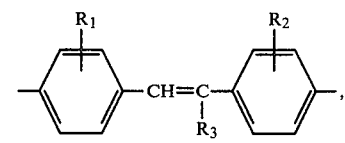

(5)

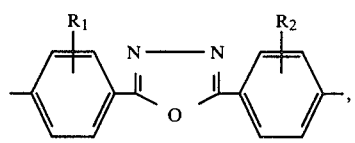

(6)

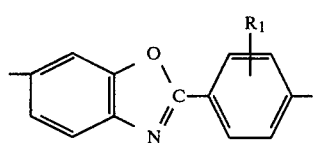

(7)

wherein $R_1$ and $R_2$ may be the same or different, and each is a group selected from hydrogen, a halogen atom, a ($C_1$–$C_4$)-alkyl group, a ($C_1$–$C_4$)alkoxy group, and a nitro group, and $R_3$ is a group selected from hydrogen, a halogen atom, and a cyano group.

Other suitable examples are shown below:

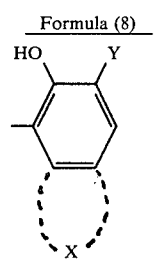

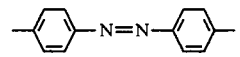

B and B' may be the same or different, and are each represented by Formula (8), (9), (10), or (11):

Formula (8)

[structure with HO and Y on benzene ring fused to X] (8)

wherein X is a group capable of being condensed with the benzene ring of Formula (8) to form a naphthalene ring, an anthracene ring, a carbazole ring, or a dibenzofuran ring, and Y is —$CONR_4R_5$ or —$COOR_5$, wherein $R_4$ is a group selected from hydrogen, a substituted or unsubstituted alkyl group, and a substituted or unsubstituted phenyl group, and $R_5$ is a group selected from a substituted or unsubstituted alkyl group, a substituted or unsubstituted phenyl group, a substituted or unsubstituted naphthyl group, a substituted or unsubstituted pyridyl group, and a substituted or unsubstituted hydrazino group.

Formula (9)

-continued

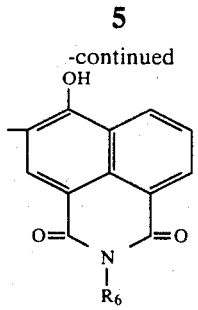

Formula (10)

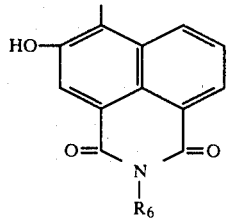

$R_6$ is a group selected from a substituted or unsubstituted alkyl group and a substituted or unsubstituted phenyl group.

Examples of substituents which can be used in $R_4$ and $R_5$ include an alkyl group, e.g., methyl, ethyl, etc., a halogen atom, e.g., fluorine, chlorine, bromine, etc., an alkoxy group, e.g., methoxy, ethoxy, etc., an acyl group, e.g., acetyl, benzoyl, etc., an alkylthio group, e.g., methylthio, ethylthio, etc., an arylthio group, e.g., phenylthio, etc., an aryl group, e.g., phenyl, etc., an aralkyl group, e.g., benzyl, etc., a nitro group, a cyano group, a dialkylamino group, e.g., dimethylamino, diethylamino, etc., an alkylamino group, e.g., methylamino, ethylamino, etc., and so forth.

Examples of $R_6$ include an alkyl group, e.g., methyl, ethyl, propyl, etc., a hydroxyalkyl group, e.g., hydroxymethyl, hydroxyethyl, etc., an alkoxyalkyl group, e.g., methoxymethyl, ethoxymethyl, ethoxyethyl, etc., a cyano group, an aminoalkyl group, an N-alkylaminoalkyl group, an N,N-dialkylaminoalkyl group, a halogenated alkyl group, an aralkyl group, e.g., benzyl, phenethyl, etc., a phenyl group, a substituted phenyl group (wherein the substituent is the same as described in $R_4$ and $R_5$), etc.

Formula (11)

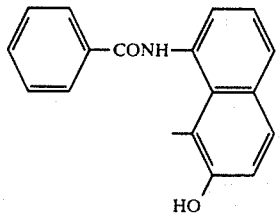

The dis-azo compound represented by Formula (1) which is used in this invention can be prepared as follows:

A monoazo compound containing therein an aldehydo group is synthesized by diazotizing a p-aminobenzaldehyde by the usual procedure and then coupling the diazonium salt so obtained with the above described coupler in the presence of an alkali, or by once isolating the diazonium salt of p-aminobenzaldehyde in a boron fluoride or zinc chloride salt form and then coupling the diazonium salt with the above described coupler in a suitable solvent in the presence of an alkali.

The thus-obtained single monoazo compound is mixed with hydrazine or a diamine, preferably at a molar ratio of monoazo compound to hydrazine or diamine of about 2:1, in a suitable solvent (e.g., dimethylformamide, dimethyl sulfoxide, etc.) and they are reacted by heating at about 100° to 120° C. for about 3 to 10 hours to prepare a dis-azo compound containing the same coupler, which is represented by Formula (1).

Where in reacting the monoazo compound with the diamine, the diamine is in the form of a hydrochloric acid or sulfuric acid salt, addition of a small amount of water to the reaction mixture may increase sensitivity irrespective of the dehydration reaction. Amines such as pyridine, piperidine, pyrolidine, etc., may exhibit the effect of a catalyst.

A dis-azo compound represented by Formula (1) wherein B and B' are different from each other can be synthesized by reacting a monoazo compound with a diamine at a molar ratio of monoazo compound to diamine of about 1:1 or in the state that the diamine is present excessively, isolating a reaction product in which one amino group of the diamine is reacted, and then condensing the reaction product with a different monoazo compound. In the first reaction between the monoazo compound and the diamine, the formation of dis-azo compound is inevitable. Therefore, when considered from standpoints of purification of the intermediate product, number of reaction stages, purification of the final compound, etc., it is generally advantageous to prepare a compound in which B and B' are the same.

It is to be noted that the above explanation has been provided with respect to a general method of production of the compound of Formula (1), but that this invention is not limited to compounds produced by said method.

Dis-azo compounds which can be used in this invention are very sparingly soluble in almost all organic solvents except for amines, such as ethylenediamine, butylamine, etc., and many of the solutions obtained therewith are red, red-purple or purple in color.

The color tone and electrophotographic sensitivity of the dis-azo compound slightly vary depending on the type of the diazo component and coupler thereof. When A is a single chemical bond in Formula (1), many of the resulting dis-azo compounds are highly sensitive. From a viewpoint of red color-reproduction capability, those compounds in which A is a group represented by Formula (6) are particularly preferred.

The electrophotographic light-sensitive medium of this invention comprises a light-sensitive layer containing therein a dis-azo compound represented by Formula (1). The dis-azo compound of Formula (1) can be used in any of the light-sensitive media (1) to (4) as hereinbefore described, as well as in other known types. In order to increase the transport efficiency of charge carriers produced by light absorption of the dis-azo compound of Formula (1), it is desirable to use the dis-azo compound in the construction of the light-sensitive media (2), (3), and (4). The optimum structure of the light-sensitive medium in which the dis-azo compound of this invention is to be used is that of the light-sensitive medium (3), in which the function of generating charge carriers and the function of transporting the charge carriers are separated, so that the characteristics of the dis-azo compound are efficiently exhibited.

The following explanation, therefore, is provided with respect to the electrophotographic light-sensitive medium of the optimum structure.

An electrically conductive layer, a charge generation layer and a charge transport layer are essential in the light-sensitive medium. The charge generation layer may be provided either on the charge transport layer or under the charge transport layer. In an electrophotographic light-sensitive medium of the type that is repeatedly used, it is preferred that they are laminated in the order of the electrically conductive layer, the charge generation layer and the charge transport layer, mainly from a viewpoint of physical strength and in some cases from a viewpoint of charging properties. For the purpose of increasing the adhesion between the electrically conductive layer and the charge generation layer, if desired, an adhesion layer may be provided therebetween.

As the electrically conductive layer, those having a surface resistance of about $10^{10}\Omega$ or less, preferably, about $10^7\Omega$ or less, such as a metal (e.g., aluminum) plate or foil, a metal (e.g., aluminum) vapor-deposited plastic film, a sheet prepared by bonding together an aluminum foil and paper, a paper made electrically conductive, etc., can be used.

Materials which can effectively be used in forming the adhesion layer include casein, polyvinyl alcohol, water-soluble polyethylene, nitrocellulose and the like.

The thickness of the adhesion layer is from about $0.1\mu$ to about $5\mu$ and preferably from about $0.5\mu$ to about $3\mu$.

Fine particles of the dis-azo compound of Formula (1) are coated, if necessary after being dispersed in a suitable binder, on the charge generation layer or the adhesion layer provided on the electrically conductive layer. The dispersion of the dis-azo compound can be carried out by known procedures using a ball mill, an attritor or the like. The particle size of the dis-azo compound is usually about $5\mu$ or less and preferably about $2\mu$ or less, with the optimum particle size being about $0.5\mu$ or less.

The dis-azo compound can be dissolved in an amine-based solvent, e.g., ethylenediamine, and coated. The coating of the dis-azo compound can be carried out by known procedures such as blade coating, Meyer bar coating, spray coating, soak coating, etc.

The thickness of the charge generation layer is usually about $5\mu$ or less and preferably from about $0.01\mu$ to $1\mu$.

Where a binder is used in the charge generation layer, the proportion of the binder in the charge generation layer is usually about 80% or less and preferably about 40% or less, because if the amount of the binder is large, the sensitivity of the light-sensitive medium will be adversely affected.

Binders which can be used include polyvinyl butyral, polyvinyl acetate, polyester, polycarbonate, a phenoxy resin, an acryl resin, polyacrylamide, polyamide, polyvinyl pyridine, a cellulose resin, an urethane resin, an epoxy resin, casein, polyvinyl alcohol, etc.

In order to achieve uniform injection of charge carriers from the charge generation layer into the charge transport layer lying on the charge generation layer, if necessary, the surface of the charge generation layer can be ground and planished.

On the thus-provided charge generation layer is provided the charge transport layer. Where the charge transport substance has no film-forming capability, a binder is dissolved in a suitable solvent and coated by the conventional procedure to form the charge transport layer. The charge transport substance is divided into an electron transport substance and a positive hole transport substance.

Examples of such electron transport substances include electron attractive substances such as chloranil, bromanil, tetracyanoethylene, tetracyanoquinodimethane, 2,4,7-trinitro-9-fluorenone, 2,4,5,7-tetranitrofluorenone, 2,4,7-trinitro-9-dicyanomethylenefluorenone, 2,4,5,7-tetranitroxathone, 2,4,8-trinitrothioxanthone, etc., and their polymerization products.

Examples of positive hole transport substances include pyrene, N-ethyl carbazole, N-isopropyl carbazole, 2,5-bis(p-diethylaminophenyl)-1,3,4-oxadiazole, 1-phenyl-3-(p-diethylaminostyryl)-5-(p-diethylaminophenyl)pyrazolone, 1-(pyridyl-(2))-3-(p-diethylaminostyryl)-5-(p-diethylaminophenyl)pyrazolone, 1-(quinolyl-(2))-3-(p-diethylaminostyryl)-5-(p-diethylaminophenyl)pyrazolone, triphenylamine, poly-N-vinyl carbazole, halogenated poly-N-vinyl carbazole, polyvinyl pyrene, polyvinyl anthracene, polyvinyl acridine, poly-9-vinylphenyl anthracene, a pyreneformaldehyde resin, an ethyl carbazole-formaldehyde resin, etc.

Charge transport substances which can be used are not limited to those described above, and they can be used alone or in combination with each other. The thickness of the charge transport layer is usually from about $5\mu$ to $30\mu$, and preferably from about $8\mu$ to $20\mu$.

Binders which can be used include an acryl resin, polystyrene, polyester, polycarbonate, etc. As binders for low molecular weight positive hole transport substances, positive hole transport polymers such as poly-N-vinyl carbazole can be used. On the other hand, as binders for low molecular weight electron transport substances, polymers of electron transport monomers as described in U.S. Pat. No. 4,122,113 can be used.

In the light-sensitive medium comprising the electrically conductive layer, the charge generation layer on the electrically conductive layer and the charge transport layer lying on the charge generation layer wherein the charge transport substance is an electron transport substance, the surface of the charge transport layer is required to be charged positively, and when the light-sensitive medium is exposed to light after the charging, electrons generated in the charge generation layer are injected into the charge transport layer at exposed areas and reach the surface of the charge transport layer, neutralizing positive charges thereon, as a result of which a decay of surface potential occurs, and the electrostatic contrast is formed between exposed areas and unexposed areas. On developing the thus-formed electrostatic latent image with negatively charged toners, a visible image is obtained. This visible image can be fixed either directly or after being transferred to paper or a plastic film.

Alternatively, the electrostatic latent image may be transferred onto an insulative layer of a transfer paper, and then developed and fixed. The type of the developer, the developing method and the fixing method are not critical, and any known developer, developing method and fixing method can be employed.

On the other hand, when the charge transport substance is a positive hole transport substance, the surface of the charge transport layer is required to be charged negatively, and when the light-sensitive medium is exposed to light after the charging, positive holes generated in the charge generation layer are injected into the charge transport layer at exposed areas and then reach the surface of the charge transport layer, neutralizing the negative charges, as a result of which the decay of surface potential occurs and the electrostatic contrast is formed between exposed areas and unexposed areas. In this case, therefore, it is necessary to use positively charged toners for development of electrostatic latent images.

A light-sensitive medium of type (1) according to the present invention can be prepared by dispersing the dis-azo compound of Formula (1) in an insulative binder solution as used in the charge transport layer of the light-sensitive medium of type (3) as described above and coating the resulting dispersion on an electrically conductive support.

A light-sensitive medium of type (2) according to the present invention can be prepared by dissolving an insulative binder as used in the charge transport substance and charge transport layer of the light-sensitive medium of type (3) in a suitable solvent, dispersing the dis-azo compound of Formula (1) in the solution obtained above, and by coating the resulting dispersion on an electrically conductive support.

A light-sensitive medium of type (4) according to the present invention can be prepared by dispersing the dis-azo compound of Formula (1) in a solution of a charge transfer complex, which is formed on mixing the electron transport substance described in the light-sensitive medium of type (3) and the positive hole transport substance, and coating the resulting dispersion on the electrically conductive support.

If desired, the dis-azo compound of Formula (1) may be used in combination with other compounds as pigments having different light absorption ranges in order to increase the sensitivity of the light-sensitive medium. Furthermore, for the purpose of obtaining panchromatic light-sensitive media, two or more of the dis-azo compounds may be combined together, or the dis-azo compound may be used in combination with charge generating substances selected from known dyes and pigments.

The electrophotographic light-sensitive medium of this invention can be used not only in an electrophotographic copying machine, but also in other applications wherein electrophotography is utilized, such as in laser printing, CRT (cathode-ray tube) printing, etc.

Hereinafter, preparation of dis-azo compounds as used in this invention will be explained by reference to the preparation of examples thereof.

SYNTHESIS EXAMPLE 1

Preparation of Compound No. 1

(A) Preparation of the Monoazo Compound

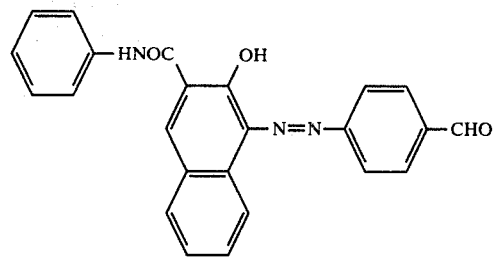

A mixture of 680 ml of water, 51 ml (0.58 mol) of concentrated hydrochloric acid and 19.2 g (0.14 mol) of p-aminobenzaldehyde was placed in a 1-liter beaker and adjusted to 3° C. by cooling in an ice water bath while stirring. A solution of 13.2 g (0.191 mol) of sodium nitrite in 30 ml of water was dropwise added thereto over a period of 30 minutes while maintaining the temperature of the resulting mixture at from 3° to 6° C. After the dropwise addition was completed, the mixture was stirred at that temperature for an additional 30 minutes. Carbon was then added to the reaction mixture, and the resulting mixture was filtered to obtain a diazonium salt solution.

Next, 1.8 liters of water was placed in a 3-liter beaker and 66 g (1.65 mol) of sodium hydroxide was dissolved therein, and 43.5 g (0.165 mol) of Naphthol AS (3-hydroxy-2-naphthoic acid anilide) was then dissolved in the resulting solution to prepare a coupler solution.

To the thus-obtained coupler solution was dropwise added the above diazonium salt solution over a period of 40 minutes while adjusting the temperature of the resulting mixture at from 6° to 8° C. by cooling in an ice water bath. At the end of the time, the ice water bath was removed, and the mixture was stirred at room temperature for an additional 2 hours and then allowed to stand overnight.

The thus-obtained reaction mixture was filtered to obtain a solid portion. This solid portion was fully washed with water and then washed by heat-filtering with acetone and then MEK (methyl ethyl ketone) to obtain 43.0 g of a compound having a decomposition point of 259°–262° C.

This compound was recrystallized from DMF (dimethylformamide) to obtain 34 g of the desired product having a decomposition point of 266°–268° C.

Yield: 54%.

Visible Absorption Spectrum: Maximum absorption wavelength, 533 nm (o-dichlorobenzene solution).

Infrared Absorption Spectrum: Aldehyde group, 1690 cm$^{-1}$. Amide group, 1670 cm$^{-1}$.

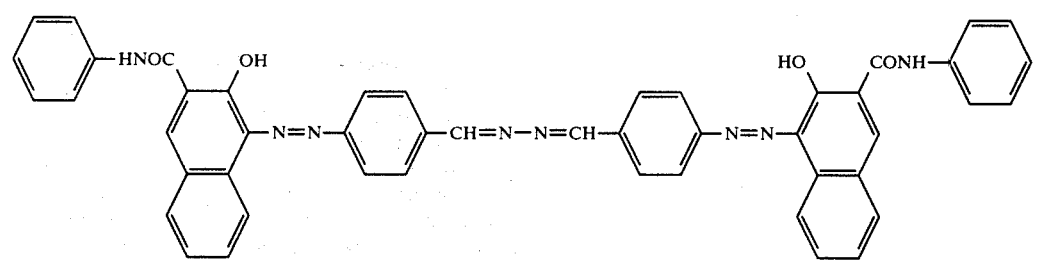

(B) Preparation of Compound No. 1

A mixture of 6.0 g (0.0152 mol) of the monoazo compound obtained in (A) above and 900 ml of DMF was placed in a 1-liter three necked flask and raised to 70° C. by heating while stirring. A solution of 0.99 g (0.0076 mol) of hydrazinium sulfate in 14 ml of water was added to the above mixture, and the resulting solution was raised to 110° C. and stirred for 3 hours at that temperature. The reaction solution was then heat-filtered and a solid portion precipitated was filtered off. The solid portion was washed by heat-filtering with 300 ml of DMF and then with 300 ml of MEK and dried by heating under reduced pressure to obtain 5.7 g of the desired compound (yield, 96%).

Decomposition Point: more than 300° C.

Visible Absorption Spectrum: Maximum absorption wavelength, 580 nm (trichlorobenzene solution).

Infrared Absorption Spectrum: Amide: 1670 cm$^{-1}$.

The absorption at 1690 cm$^{-1}$ (—CHO) observed in the starting material completely disappeared.

SYNTHESIS EXAMPLE 2

Preparation of Compound No. 2

A mixture of 15 g (0.038 mol) of the monoazo compound obtained in (A) of Synthesis Example 1, 4.2 g (0.019 mol) of 6-amino-2-(p-aminophenyl)benzoxazole and 350 ml of DMF was placed in a 1-liter three necked flask and raised to 120° C. by heating while stirring. The mixture was reacted for 10 hours at that temperature. The reaction mixture was heat-filtered to obtain a compound insoluble in DMF. This compound was washed by heat-filtering with 400 ml of DMF and then with 400 ml of MEK, and dried by heating under reduced pressure to obtain 11.3 g of the desired compound (yield, 61%).

Decomposition Point: more than 300° C.

Visible Absorption Spectrum: Maximum absorption wavelength: 552 nm (trichlorobenzene solution).

Infrared Absorption Spectrum: Amide: 1670 cm$^{-1}$.

The absorption at 1690 cm$^{-1}$ (—CHO) observed in the starting material, monoazo compound, completely disappeared.

Other dis-azo compounds represented by Formula (1) can be prepared in an analogous manner as described above.

The following examples of electrophotographic media are provided to illustrate this invention in greater detail.

EXAMPLE 1

An ammonium aqueous solution of casein (casein 11.2 g, 28% aqueous ammonia 1 g and water 222 ml) was coated on an aluminum vapor-deposited Mylar (trademark of E. I. du Pont for polyethylene terephthalate) film at the side of the aluminum surface with a Meyer bar and dried to form an adhesion layer of a coating amount of 1.0 g/m$^2$.

Next, 5 g of Compound No. 1 and a solution of 2 g of a butyral resin (degree of butyralation, 63 mol %) in 95 ml of ethanol were ball-milled for 40 hours to form a dispersion. This dispersion was then coated on the adhesion layer obtained above with a Meyer bar and dried to form a charge generation layer of a coating amount of 0.25 g/m$^2$.

Next, a solution of 5 g of 1-phenyl-3-(p-diethylaminostyryl)-5-(p-diethylaminophenyl)pyrazoline and 5 g of poly-4,4'-dioxydiphenyl-2,2-propanecarbonate (molecular weight, 30,000) in 70 ml of tetrahydrofuran was coated on the charge generation layer obtained above with a Baker applicator to form a charge transport layer of a coating amount of 10 g/m$^2$.

The thus-obtained electrophotographic light-sensitive medium was conditioned at 20° C. and 65% relative humidity for 24 hours, corona-charged at −5 KV by the use of an electrostatic copying paper testing apparatus, Model SP-428 (produced by Kawaguchi Denki Co., Ltd.) according to the static method, and held in a dark place for 10 seconds. At the end of the time, it was exposed to light at an intensity of illumination of 5 lux, and its charging characteristics were examined.

The results are shown below, in which $V_o$ (−v), $V_k$ (%) and $E_{\frac{1}{2}}$ (lux.sec) indicate, respectively, the initial potential, the potential retention in a dark place for the period of 10 seconds, and the exposure amount for half decay.

$V_o$: −560 v
$V_k$: 99%
$E_{\frac{1}{2}}$: 8.8 lux.sec

EXAMPLE 2

On a charge generation layer prepared as in Example 1 was coated a solution of 5 g of triphenylamine and 5 g of polyvinyl carbazole (molecular weight, 300,000) in 70 ml of tetrahydrofuran with a Meyer bar and dried to form a charge transport layer of a coating amount of 10 g/m$^2$.

The thus-obtained light-sensitive medium was measured in charging characteristics in the same manner as in Example 1. The results are as follows:

$V_o$: −580 v
$V_k$: 93%
$E_{\frac{1}{2}}$: 16 lux.sec

EXAMPLE 3

A mixture of 5 g of Compound No. 2 and a solution of 2 g of a butyral resin (degree of butyralation, 63 mol %) in 95 ml of ethanol were ball-milled for 40 hours to form a dispersion. This dispersion was coated on an aluminum vapor-deposited Mylar film with the adhesion layer provided thereon as prepared in Example 1 at the side of the adhesion layer and dried to form a charge generation layer of a coating amount of 0.20 g/m$^2$.

On the charge generation layer so obtained was coated a solution of 5 g of 2,5-bis(p-diethylaminophenyl)-1,3,4-oxadiazole and 5 g of the same polycarbonate as used in Example 1 in 70 ml of tetrahydrofuran with a Baker applicator and dried to form a charge transport layer of a coating amount of 9.5 g/m².

The thus-obtained light-sensitive medium was measured in charging characteristics in the same manner as in Example 1. The results are as follows:
$V_o$: −520 v
$V_k$: 95%
$E_{\frac{1}{2}}$: 9.5 lux.sec

EXAMPLE 4

On the charge generation layer prepared in Example 3 was coated a solution of 5 g of 2,4,7-trinitrofluorenone and 5 g of a phenoxy resin (PKHH, produced by Union Carbide Co.) in 70 ml of tetrahydrofuran with a Baker applicator and dried to form a charge transport layer of a coating amount of 11 g/m².

The thus-obtained light-sensitive medium was measured in charging characteristics in the same manner as in Example 1. The results are as follows:
$V_o$: 580 v
$V_k$: 93%
$E_{\frac{1}{2}}$: 19 lux.sec

EXAMPLES 5 TO 36

In these Examples, a series of light-sensitive media were prepared using various dis-azo compounds and examined for charging characteristics.

A mixture of 5 g of a dis-azo compound (A, B and of Formula (1) are shown in Table 1), 10 g of a polyester resin solution (Polyester Adhesive 49,000, produced by E. I. du Pont Co.; solid content, 20%) and 80 ml of tetrahydrofuran was ball-milled for 40 hours to form a dispersion. This dispersion was coated on an aluminum vapor-deposited Mylar film at the side of the aluminum surface with a Meyer bar and dried to form a charge generation layer of a coating amount of 0.3 g/m².

Next, a solution of 5 g of 1-phenyl-3-(p-diethylaminostyryl)-5-(p-diethylaminophenyl)pyrazoline and 5 g of a polystyrene resin (Sanrex SAN-H, produced by Mitsubishi Monsant Co., Ltd.) in 70 ml of tetrahydrofuran was coated on the charge generation layer obtained above with a Baker applicator and dried to form a charge transport layer of a coating amount of 10 g/m².

The thus-obtained light-sensitive medium was measured for charging characteristics in the same manner as in Example 1. The results are shown in Table 2.

TABLE 1

| Example | Compound No. | Dis-azo Compound A | B | B' |
|---|---|---|---|---|
| 5 | 3 | — (single chemical bond) | 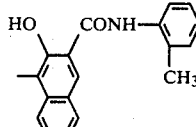 | B (same as B) |
| 6 | 4 | — | 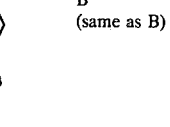 | B |
| 7 | 5 | — | 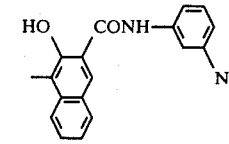 | B |
| 8 | 6 | — | 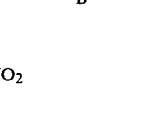 | B |
| 9 | 7 | — | 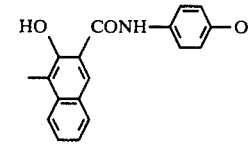 | B |

TABLE 1-continued

| Example | Compound No. | Dis-azo Compound A | Dis-azo Compound B | Dis-azo Compound B' |
|---|---|---|---|---|
| 10 | 8 | — | 3-hydroxy-4-methyl-N-(2,4-dimethylphenyl)-2-naphthamide | B |
| 11 | 9 | — | 3-hydroxy-4-methyl-N-[4-(N,N-diethylamino)phenyl]-2-naphthamide | B |
| 12 | 10 | — | 3-hydroxy-4-methyl-N-(2-hydroxyethyl)-2-naphthamide | B |
| 13 | 11 | — | 3-hydroxy-4-methyl-N-(2-naphthyl)-2-naphthamide | B |
| 14 | 12 | — | 3-hydroxy-4-methyl-N-(1-naphthyl)-2-naphthamide | B |
| 15 | 13 | — | structure with HO, CONH-C$_6$H$_4$-Cl, and HN-phenyl substituent | B |
| 16 | 14 | — | 3-hydroxy-4-methyl-N-(2,5-dimethoxyphenyl)-2-naphthamide | B |

TABLE 1-continued

| Example | Compound No. | Dis-azo Compound A | B | B' |
|---|---|---|---|---|
| 17 | 15 | — | 4-hydroxy-methylnaphthalene-1,8-dicarboximide (N-methyl) | B |
| 18 | 16 | — | 2-hydroxy-3-methyl-5-(2-phenoxy)-N-(2,5-dimethoxyphenyl)benzamide | B |
| 19 | 17 | 1,4-phenylene | 3-hydroxy-4-methyl-N-phenyl-2-naphthamide | B |
| 20 | 18 | 1,4-phenylene | 3-hydroxy-4-methyl-N-ethyl-N-phenyl-2-naphthamide | B |
| 21 | 19 | 1,5-naphthylene | 3-hydroxy-4-methyl-N-phenyl-2-naphthamide | B |
| 22 | 20 | 4,4'-stilbenediyl (—CH=CH—) | 3-hydroxy-4-methyl-N-phenyl-2-naphthamide | B |
| 23 | 21 | 4,4'-(α-cyanostilbenediyl) (—CH=C(CN)—) | 3-hydroxy-4-methyl-N-phenyl-2-naphthamide | B |

| Example | Compound No. | Dis-azo Compound A | Dis-azo Compound B | B' |
|---|---|---|---|---|
| 24 | 22 | 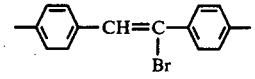 | 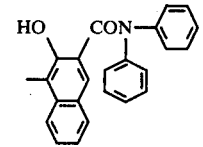 | B |
| 25 | 23 | 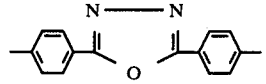 | 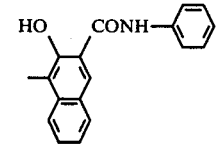 | B |
| 26 | 24 | 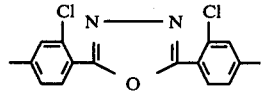 | 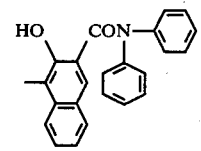 | B |
| 27 | 25 | 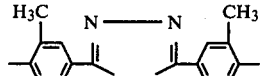 | 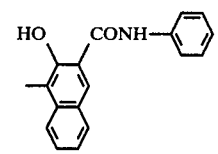 | 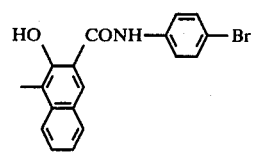 |
| 28 | 26 | 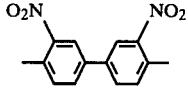 | 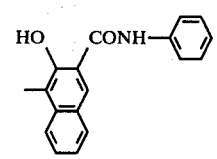 | B |
| 29 | 27 | 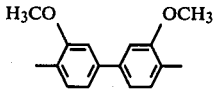 | 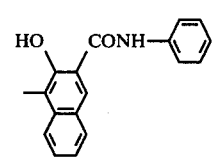 | B |
| 30 | 28 | 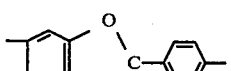 | 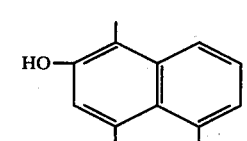 | B |
| 31 | 29 |  | 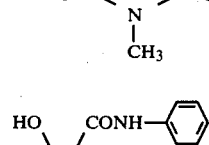 | B |
| 32 | 30 |  | 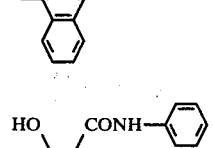 | B |

TABLE 1-continued

| Example | Compound No. | Dis-azo Compound A | B | B' |
|---|---|---|---|---|
| 33 | 31 |  | 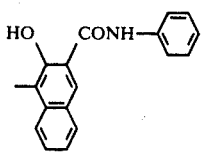 | B |
| 34 | 32 | — | 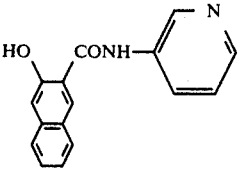 | B |
| 35 | 33 | — | 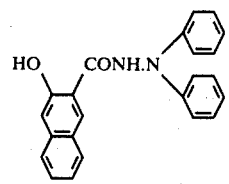 | B |
| 36 | 34 | — | 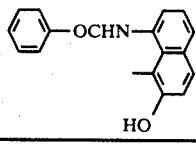 | B |

TABLE 2

| | Charging Characteristic Values | | |
|---|---|---|---|
| Example | $V_o(-v)$ | $V_k$ (%) | $E_{\frac{1}{2}}$ (lux · sec) |
| 5 | 560 | 87 | 8.0 |
| 6 | 530 | 84 | 8.3 |
| 7 | 555 | 84 | 8.8 |
| 8 | 520 | 83 | 8.4 |
| 9 | 560 | 88 | 9.0 |
| 10 | 590 | 92 | 9.3 |
| 11 | 500 | 83 | 8.6 |
| 12 | 515 | 84 | 10.0 |
| 13 | 560 | 89 | 8.5 |
| 14 | 570 | 91 | 9.2 |
| 15 | 580 | 88 | 8.9 |
| 16 | 560 | 84 | 9.3 |
| 17 | 530 | 89 | 13.0 |
| 18 | 550 | 89 | 9.9 |
| 19 | 575 | 92 | 10.3 |
| 20 | 560 | 90 | 10.6 |
| 21 | 535 | 84 | 15.0 |
| 22 | 560 | 89 | 10.3 |
| 23 | 515 | 88 | 10.9 |
| 24 | 540 | 91 | 12.0 |
| 25 | 560 | 95 | 8.8 |
| 26 | 570 | 95 | 9.4 |
| 27 | 530 | 88 | 8.5 |
| 28 | 520 | 84 | 14.0 |
| 29 | 540 | 86 | 12.0 |
| 30 | 530 | 88 | 13.0 |
| 31 | 560 | 87 | 12.0 |
| 32 | 560 | 86 | 14.0 |
| 33 | 535 | 89 | 9.0 |
| 34 | 550 | 90 | 14.3 |
| 35 | 540 | 89 | 13.6 |
| 36 | 560 | 91 | 9.5 |

EXAMPLE 37

A mixture of 5 g of the same polycarbonate as used in Example 1 and 5 g of 1-(6-methoxypyrrolidyl-(2))-3-(p-diethylaminostyryl)-5-(p-diethylaminophenyl)pyrazoline was dissolved in 60 ml of tetrahydrofuran, and 1.0 g of Compond No. 23 shown in Table 1 was added thereto. The resulting mixture was ball-milled for 40 hours to form a dispersion. This disperson was coated on the same support with the adhesion layer provided thereon as used in Example 1 at the side of the adhesion layer with a Meyer bar and dried to form a layer of a coating amount of 11 g/m².

The thus-obtained light-sensitive medium was measured in charging characteritics in the same manner as in Example 1. The charging polarity was positive. The results are as follows:

$V_o$: +505 v $V_k$: 87%

$E_{\frac{1}{2}}$: 20.0 lux.sec

EXAMPLE 38

A mixture of 20 g of poly-N-vinyl carbazole (molecular weight, 300,000), 10 g of a polyester resin solution (Polyester Adhesive 49,000) and 3.5 g of 2,4,7-trinitrofluorene was dissolved in 180 ml of tetrahydrofuran, and 2.0 g of Compound No. 10 was added thereto. The resulting mixture was ball-milled for 40 hours to form a dispersion. This dispersion was coated on the same support with the adhesion layer provided thereon as used in Example 1 at the side of the adhesion layer by the use of a Meyer bar and dried to form a layer having a coating amount of 10 g/m².

The thus-obtained light-sensitive medium was measured in charging characteristics in the same manner as in Example 1. The charging polarity was positive. The results are as follows:

$V_o$: +460 v
$V_k$: 83%
$E_{\frac{1}{2}}$: 21 lux.sec

EXAMPLE 39

To a solution prepared by dissolving 200 g of a polyamide resin (Ultramid IC, produced by BASF) in 9.5 liters of methanol was added 500 g of Compound No. 1, and the resulting mixture was ball-milled for 80 hours to form a dispersion. This dispersion was coated on an aluminum drum by the dipping method in a dry thickness of 0.3 g/m² to provide a charge generation layer.

On the charge generation layer so formed was coated a solution of 500 g of 1-(lepidyl-(2))-3-(p-diethylaminostyryl)-5-(p-diethylaminophenyl)pyrazoline and 500 g of a polymethyl methacrylate resin in 7 liters of tetrahydrofuran and dried to form a charge transport layer of a coating amount of 11 g/m².

A test piece was prepared by coating on an aluminum vapor-deposited Mylar film under the same conditions as described above and measured in charging characteristics in the same manner as in Example 1. The results are as follows:

$V_o$: −570 v
$V_k$: 94%
$E_{\frac{1}{2}}$: 8.0 lux.sec

The above obtained drum was mounted on a PPC copying machine (testing apparatus, produced by Copyer Co., Ltd.) in which a two component developer was used. After setting its surface potential to −600 v, 20,000 copies were produced. During this time, both variations in the surface potential and sensitivity were small, and excellent quality copies were obtained.

While the invention has been described in detail and with reference to specific embodiments thereof, it will be apparent to one skilled in the art that various changes and modifications can be made therein without departing from the spirit and scope thereof.

What is claimed is:

1. An electrophotographic light-sensitive medium comprising a light-sensitive layer containing a dis-azo compound represented by Formula (1)

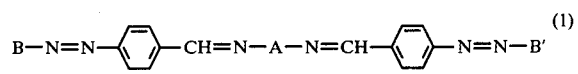

(1)

wherein A is a member selected from the group consisting of a single chemical bond, a divalent hydrocarbon group containing a conjugated double bond, a divalent hydrocarbon group containing a nitrogen atom in a conjugated double bond and a divalent heterocyclic group which may be condensed with a benzene ring or substituted and forms a conjugated double bond system in combination with the adjacent azomethine groups, and B and B', which may be the same or different, each represents a coupler having aromatic properties.

2. An electrophotographic light-sensitive medium as in claim 1, wherein A of Formula (1) is a single chemical bond or a divalent group represented by Formula (2), (3), (4), (5), (6), or (7),

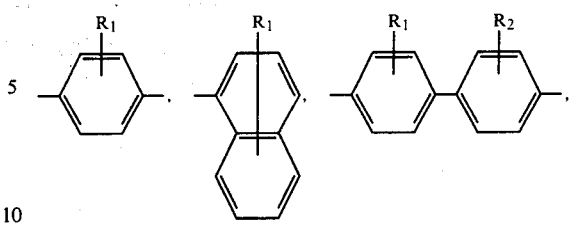

(2)   (3)   (4)

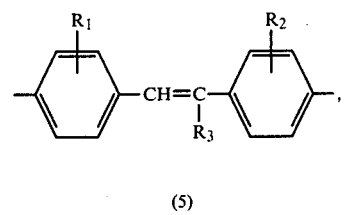

(5)

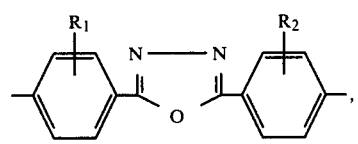

(6)

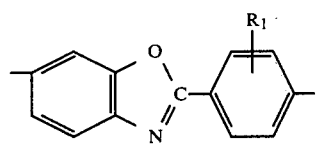

(7)

wherein $R_1$ and $R_2$ may be the same or different, and each is a member selected from the group consisting of hydrogen, a halogen atom, a ($C_1$-$C_4$)-alkyl group, a ($C_1$-$C_4$)alkoxy group, and a nitro group, and $R_3$ is a member selected from the group consisting of hydrogen, a halogen atom, and a cyano group, and B and B' may be the same or different and each is a coupler represented by Formula (8), (9), (10) or (11)

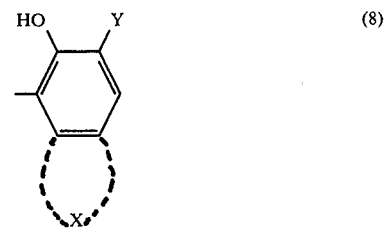

(8)

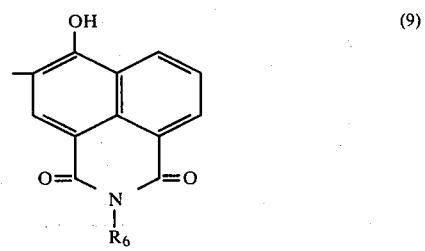

(9)

-continued

(10)
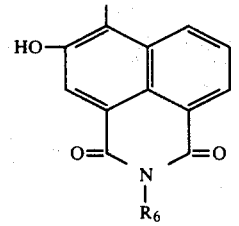

(11)
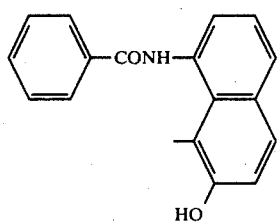

wherein

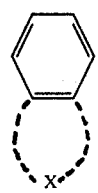

is a naphthalene ring, an anthracene ring, a carbazole ring or a dibenzofuran ring, and Y is —CONR$_4$R$_5$ or —COOR$_5$, wherein R$_4$ is a member selected from the group consisting of hydrogen, a substituted or unsubstituted alkyl group, and a substituted or unsubstituted phenyl group, and R$_5$ is a member selected from the group consisting of a substituted or unsubstituted alkyl group, a substituted or unsubstituted phenyl group, a substituted or unsubstituted naphthyl group, a substituted or unsubstituted pyridyl group and a diphenylamino group, and R$_6$ is a member selected from the group consisting of a substituted or unsubstituted alkyl group and a substituted or unsubstituted phenyl group.

3. An electrophotographic light-sensitive medium as in claim 1, wherein A of Formula (1) is a divalent group represented by the following formula

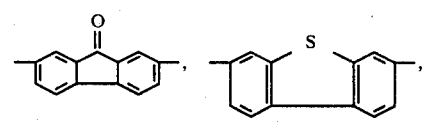

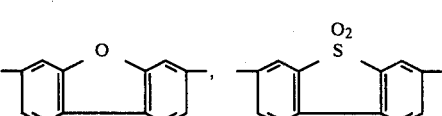

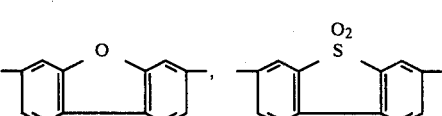

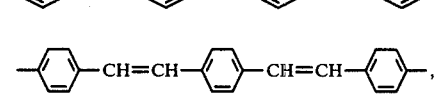

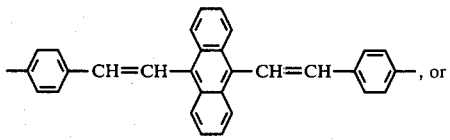

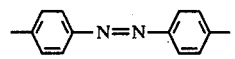

4. An electrophotographic light-sensitive medium as in claim 2, or 3, wherein Couplers B and B' are the same.

5. An electrophotograpic light-sensitive medium as in claim 2, or 3, wherein A of Formula (1) is a single bond and Couplers B and B' are the same.

6. An electrophotographic light-sensitive medium as in claim 2, or 3, wherein A of Formula (1) is represented by Formula (6) and Couplers B and B' are the same.

7. An electrophotographic light-sensitive medium as in claim 1, wherein the dis-azo compound is represented by the structural formula

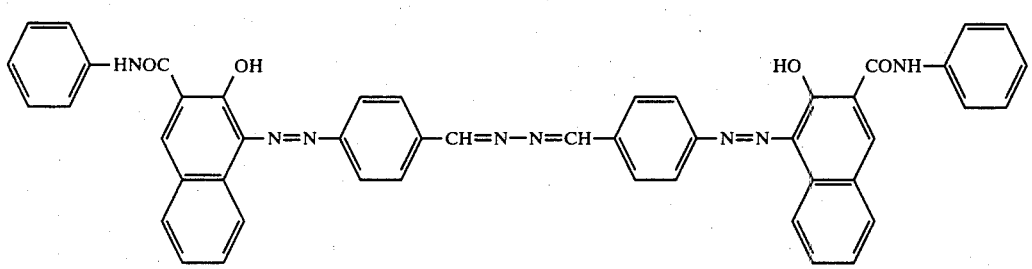

8. An electrophotographic light-sensitive medium as in claim 1, wherein the dis-azo compound is represented by the structural formula

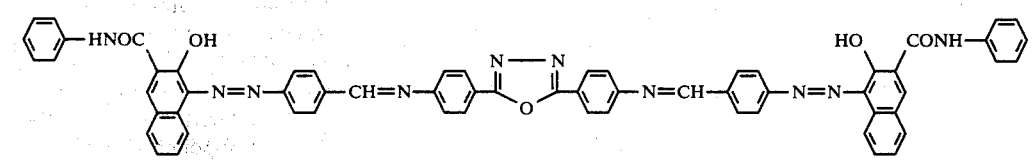

9. A dis-azo compound represented by Formula (1)

wherein A is selected from the group consisting of a single chemical bond, a divalent hydrocarbon group containing a conjugated double bond, a divalent hydrocarbon group containing a nitrogen atom in a conjugated double bond and a divalent heterocyclic group which may be condensed with a benzene ring or substituted and forms a conjugated double bond system in combination with the adjacent azomethine groups, and B and B', which may be the same or different, each represents a coupler having aromatic properties.

10. A dis-azo compound as in claim 9, wherein A of Formula (1) is a single chemical bond or a divalent group represented by Formula (2), (3), (4), (5), (6), or (7)

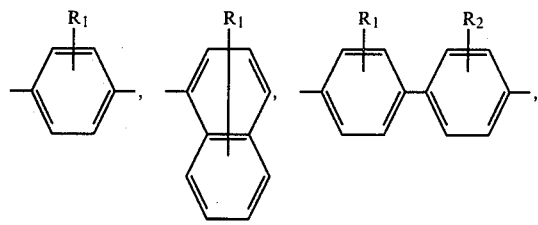

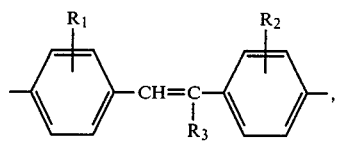

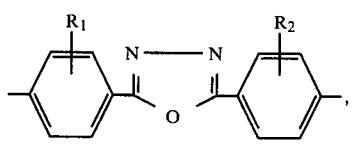

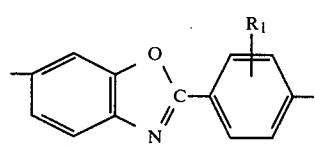

wherein $R_1$ and $R_2$ may be the same or different, and each is a member selected from the froup consisting of hydrogen, a halogen atom, a ($C_1$-$C_4$)alkyl group, a ($C_1$-$C_4$)alkoxy group, and a nitro group, and $R_3$ is a member selected from the group consisting of hydrogen, a halogen atom, and a cyano group, and B and B' may be the same or different and each is a coupler represented by Formula (8), (9), (10), or (11)

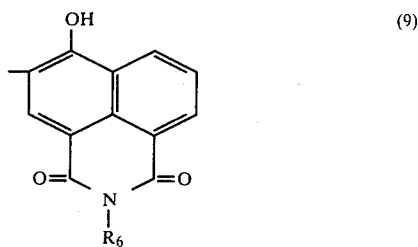

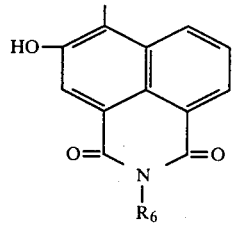

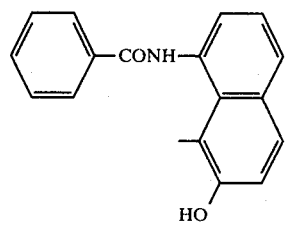

wherein

is a naphthalene ring, an anthracene ring, a carbazole ring or a dibenzofuran ring, and Y is —$CONR_4R_5$ or —$COOR_5$, wherein $R_4$ is a member selected from the group consisting of hydrogen, a substituted or unsubstituted alkyl group, and a substituted or unsubstituted phenyl group, and $R_5$ is a member selected from the group consisting of a substituted or unsubstituted alkyl group, a substituted or unsubstituted phenyl group, a substituted or unsubstituted naphthyl group, a substituted or unsubstituted pyridyl group and a diphenylamino group, and $R_6$ is a member selected from the group consisting of a substituted or unsubstituted alkyl group and a substituted or unsubstituted phenyl group.

11. A dis-azo compound as in claim 9, wherein A of Formula (1) is a divalent group represented by the following formula

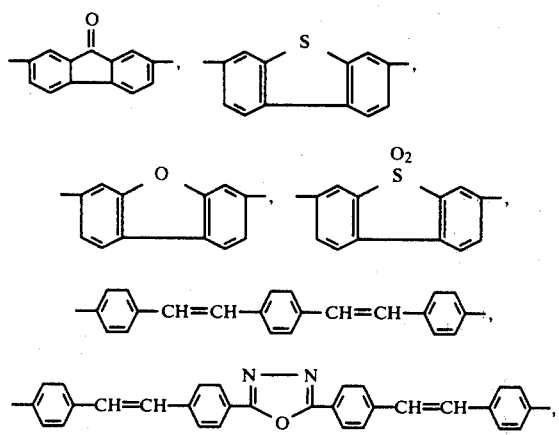

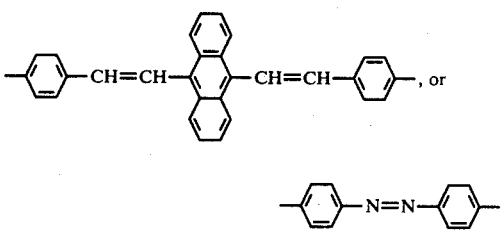

12. A dis-azo compound as in claim 10 or 11, wherein Couplers B and B' are the same.

13. A dis-azo compound as in claim 10, or 11, wherein A of Formula (1) is a single bond and Couplers B and B' are the same.

14. A dis-azo compound as in claim 10, or 11, wherein A of Formula (1) is represented by Formula (6) and Couplers B and B' are the same.

15. A dis-azo compound as in claim 9, wherein the dis-azo compound is represented by the structural formula

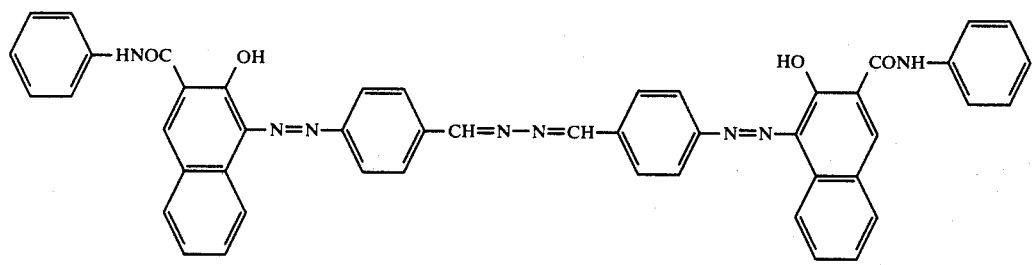

16. A dis-azo compound as in claim 9, wherein the dis-azo compound is represented by the structural formula

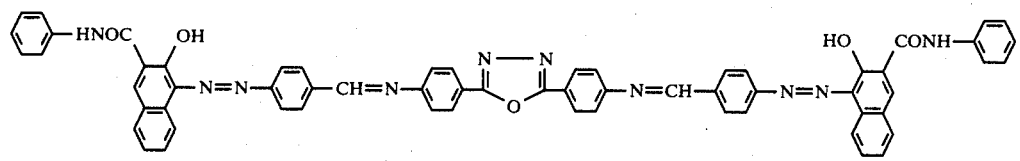

* * * * *